United States Patent
Liu et al.

(10) Patent No.: US 12,205,277 B2
(45) Date of Patent: Jan. 21, 2025

(54) TUBULAR STRUCTURE SEGMENTATION

(71) Applicant: Shanghai United Imaging Intelligence Co., Ltd., Shanghai (CN)

(72) Inventors: Yikang Liu, Cambridge, MA (US); Shanhui Sun, Lexington, MA (US); Terrence Chen, Lexington, MA (US); Zhang Chen, Brookline, MA (US); Xiao Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 450 days.

(21) Appl. No.: 17/564,304

(22) Filed: Dec. 29, 2021

(65) Prior Publication Data
US 2023/0206428 A1 Jun. 29, 2023

(51) Int. Cl.
*G06T 7/00* (2017.01)
*G06N 3/02* (2006.01)
*G06T 7/11* (2017.01)
*G06T 7/194* (2017.01)

(52) U.S. Cl.
CPC ........... *G06T 7/0012* (2013.01); *G06N 3/02* (2013.01); *G06T 7/11* (2017.01); *G06T 7/194* (2017.01); *G06T 2207/10121* (2013.01); *G06T 2207/20081* (2013.01); *G06T 2207/20084* (2013.01); *G06T 2207/30101* (2013.01)

(58) Field of Classification Search
CPC ........ G06T 7/0012; G06T 7/194; G06T 7/11; G06T 2207/10121; G06T 2207/20081; G06T 2207/20084; G06T 2207/30101; G06N 3/02
See application file for complete search history.

(56) References Cited

U.S. PATENT DOCUMENTS

| 10,460,447 | B2 | 10/2019 | Song et al. | |
|---|---|---|---|---|
| 10,878,219 | B2 | 12/2020 | Zhou et al. | |
| 2015/0235143 | A1* | 8/2015 | Eder | G16Z 99/00 706/12 |
| 2019/0080456 | A1* | 3/2019 | Song | G06T 7/174 |
| 2021/0110135 | A1* | 4/2021 | Zhou | G06N 3/084 |

FOREIGN PATENT DOCUMENTS

| CN | 106920227 B | 7/2017 |
|---|---|---|
| CN | 107292887 B | 10/2017 |
| CN | 111091573 A | 5/2020 |
| CN | 107767376 B | 3/2021 |

* cited by examiner

Primary Examiner — John J Lee
(74) Attorney, Agent, or Firm — Zhong Law, LLC

(57) ABSTRACT

Described herein are systems, methods, and instrumentalities associated with image segmentation such as tubular structure segmentation. An artificial neural network is trained to segment tubular structures of interest in a medical scan image based on annotated images of a different type of tubular structures that may have a different contrast and/or appearance from the tubular structures of interest. The training may be conducted in multiple stages during which a segmentation model learned from the annotated images during a first stage may be modified to fit the tubular structures of interest in a second stage. In examples, the tubular structures of interest may include coronary arteries, catheters, guide wires, etc., and the annotated images used for training the artificial neural network may include blood vessels such as retina blood vessels.

20 Claims, 7 Drawing Sheets

TUBULAR STRUCTURE SEGMENTATION

BACKGROUND

Segmenting tubular structures such as arteries, veins, catheters, guide wires, etc. in a medical scan image (e.g., an X-ray fluoroscopic image) may be essential for many downstream image processing tasks including, for example, visibility enhancement, multi-modal image registration, road-mapping, etc. In recent years, deep learning based segmentation techniques have been increasingly adopted in the medical imaging field and have shown superior performance than conventional image segmentation techniques. Due to the scarcity of labeled training data for tubular structures, however, these deep learning based technique have not been applied in segmentation tasks involving commonly seen tubular structures such as those described above. Accordingly, it is highly desirable to develop deep learning based systems and instrumentalities based on presently available tubular training data that may be limited to a specific type of tubular structures and transfer or adapt the knowledge learned from these training data to other types of tubular structures.

SUMMARY

Described herein are systems, methods, and instrumentalities associated with the segmentation of tubular structures. An apparatus configured to perform the segmentation task may include one or more processors that may be configured to receive a medical image (e.g., an X-ray fluoroscopic image) depicting a first type of tubular structures (e.g., catheters, guide wires, etc.), and segment the first type of tubular structures from the medical image using an artificial neural network (ANN). The ANN may be trained to segment the first type of tubular structures through a process that may comprise training the ANN during a first stage of the process to segment a second type of tubular structures (e.g., retina blood vessels) based on annotated medical images of the second type of tubular structures, and further training the ANN during a second stage of the process to segment the first type of tubular structures based on a segmentation model learned from the first stage of the training process. The second stage of the training process may comprise providing a first training image comprising the first type of tubular structures to the ANN, causing the ANN to generate a first segmentation of the first type of tubular structures based on the segmentation model learned from the first stage of the training process, correcting the first segmentation generated by the ANN based on one or more characteristics of the first type of tubular structures to derive a corrected segmentation, and causing the ANN to adjust the segmentation model based on a difference between the first segmentation generated by the ANN and the corrected segmentation.

In examples, correcting the first segmentation based on the one or more characteristics of the first type of tubular structures may comprise identifying one or more connected regions that correspond to the first type of tubular structures in the first segmentation, determining a respective size of each of the one or more connected regions, and indicating, in the corrected segmentation, whether each of the one or more connected regions includes the first type of tubular structures based on the size of the connected region. For example, a connected region may be indicated as including the first type of tubular structures if the size of the connected region is above a threshold and the connected region may be indicated as not including the first type of tubular structures if the size of the connected region is below the threshold. In examples, the size of a connected region may be determined based on the number of pixels comprised in the connected region, and identifying a connected region that may correspond to the first type of tubular structures in the first segmentation may comprise identifying a consecutive number of pixels in the first segmentation that are indicated as belonging to the first type of tubular structures and treating the area occupied by the consecutive number of pixels as the connected region.

In examples, correcting the first segmentation based on the one or more characteristics of the first type of tubular structures may comprise determining a motion of an area of the first segmentation that may be indicated as including the first type of tubular structures, and indicating, in the corrected segmentation, whether the area includes the first type of tubular structures based on the motion of the area. In examples, the motion of an area may be determined by calculating a change (e.g., a signal change, a pixel-wise displacement, etc.) between a first training image comprising the first type of tubular structures and a second training image comprising the first type of tubular structures. The motion of the area may be determined by first registering the first training image with the second training image. Using these techniques, the area may continue to be labeled as including the first type of tubular structures if the area has a larger motion than a background area of the first segmentation. Conversely, the area may be re-labeled as not including the first type of tubular structures if the area has a substantially similar motion as a background area of the first segmentation.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1:
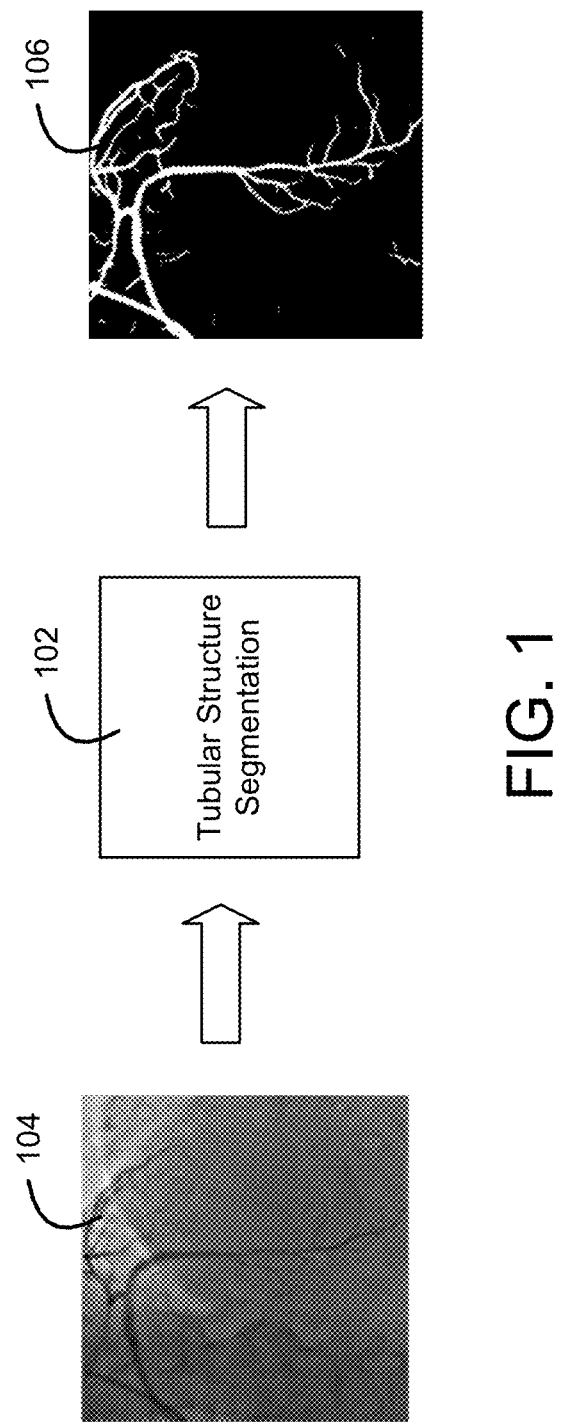
FIG. 1 is a diagram illustrating an example of a tubular structure segmentation (TSS) system or apparatus in accordance with one or more embodiments describe herein.

FIG. 1 illustrate an example of a tubular structure segmentation (TSS) system or apparatus (e.g., TSS 102) that may be configured to receive medical image 104 comprising a plurality of tubular structures and obtain segmentation 106 of the tubular structures using deep learning based techniques. Medical image 104 may include a medical scan image such as an X-ray fluoroscopic image of a human body and the tubular structures depicted in image 104 may include anatomical tubular structures of the human body (e.g., blood vessels) and/or artificially tubular structures placed into the human body (e.g., catheters, guide wires, etc.). TSS 102 may include an artificial neural network (ANN) pre-trained to segment the tubular structures from medical image 104. In examples, the ANN may include a convolutional neural network (CNN) (e.g., with a U-Net structure) having multiple convolutional layers, one or more pooling layers, and/or one or more fully-connected layers. The convolutional layers may be followed by batch normalization layers and/or linear or non-linear activation functions (e.g., such as rectified linear unit or ReLU activation functions). Each of the convolutional layers may include a plurality of convolution kernels or filters with respective weights, the values of which may be learned through a training process so as to extract features from medical image 104. The features extracted by the convolutional layers may be down-sampled through one or more pooling layers to obtain a representation of the features, for example, in the form of a feature map or a feature vector. The CNN may further include one or more un-pooling layers and one or more transposed convolutional layers. Through the un-pooling layers, the CNN may up-sample the features extracted from medical image 104 and process the up-sampled features through the one or more transposed convolutional layers (e.g., via a plurality of deconvolution operations) to derive an up-scaled or dense feature map or feature vector. The dense feature map or vector may then be used to predict areas (e.g., pixels) of medical image 104 that belong to the tubular structures.

As will be described in greater detail below, the operating parameters of the ANN (e.g., weights of the various filters or kernels of the ANN) associated with segmenting the tubular structures from medical image 104 may be learned through a training process (e.g., an offline training process) that may be conducted using labeled training images of a different type of tubular structures. Further, even though only one input medical image is shown in FIG. 1, those skilled in the art will appreciate that TSS may be configured to process multiple medical images, for example, either sequentially or in parallel.

Segmentation 106 may be obtained (e.g., generated) in different formats including, for example, in the form of one or more segmentation masks or one or more binary images. For example, a binary image generated by TSS 102 may include pixels that correspond to the pixels of medical image 104, and the pixels in the binary image that belong to the identified tubular structures may be assigned a first value (e.g., 1) while those belonging to non-tubular areas (e.g., background pixels) may be assigned a second value (e.g., 0).

Figure 2A:
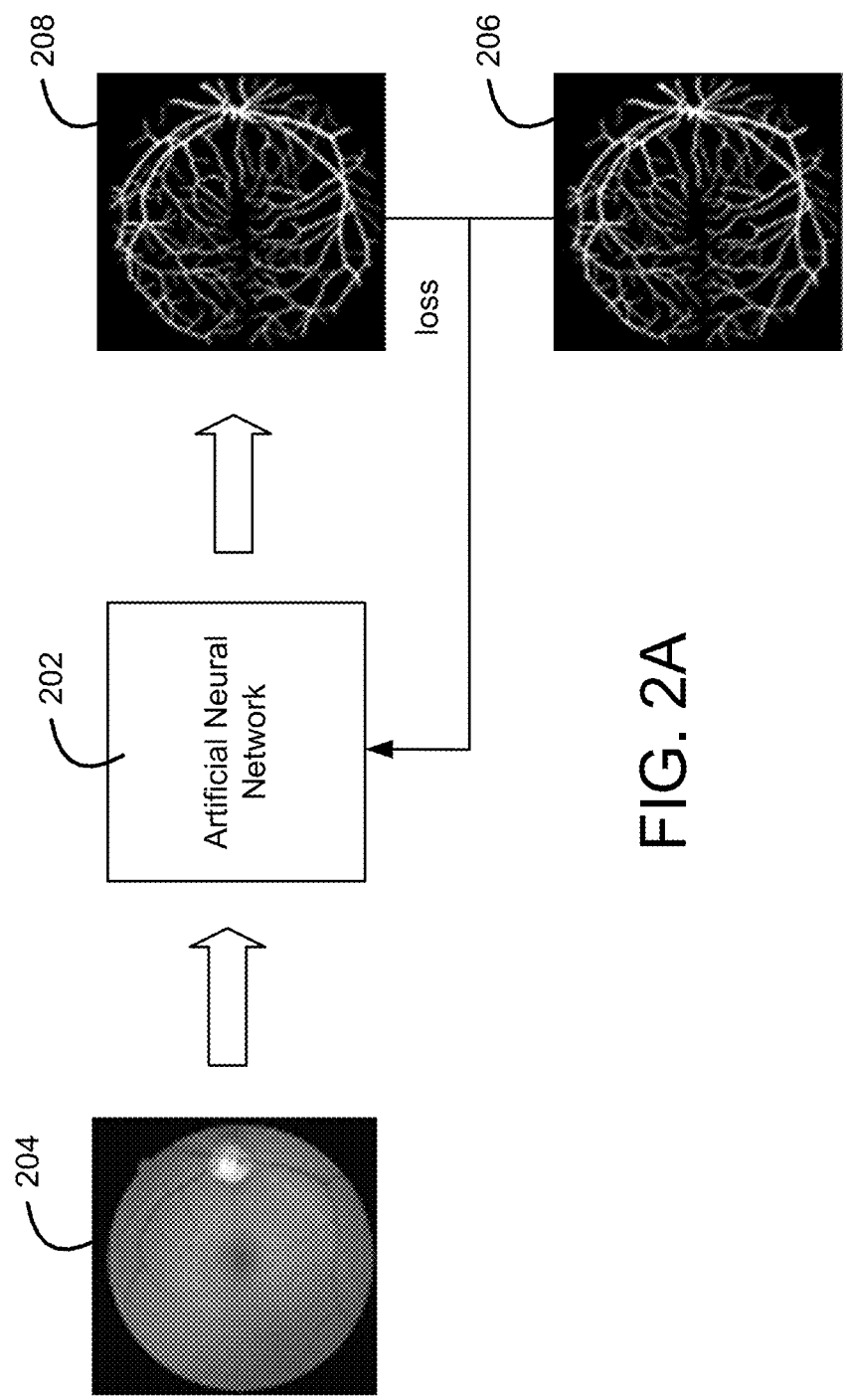
FIG. 2A is a diagram illustrating the training of an artificial neural network using annotated medical images of a certain type of tubular structures.
Figure 2B:
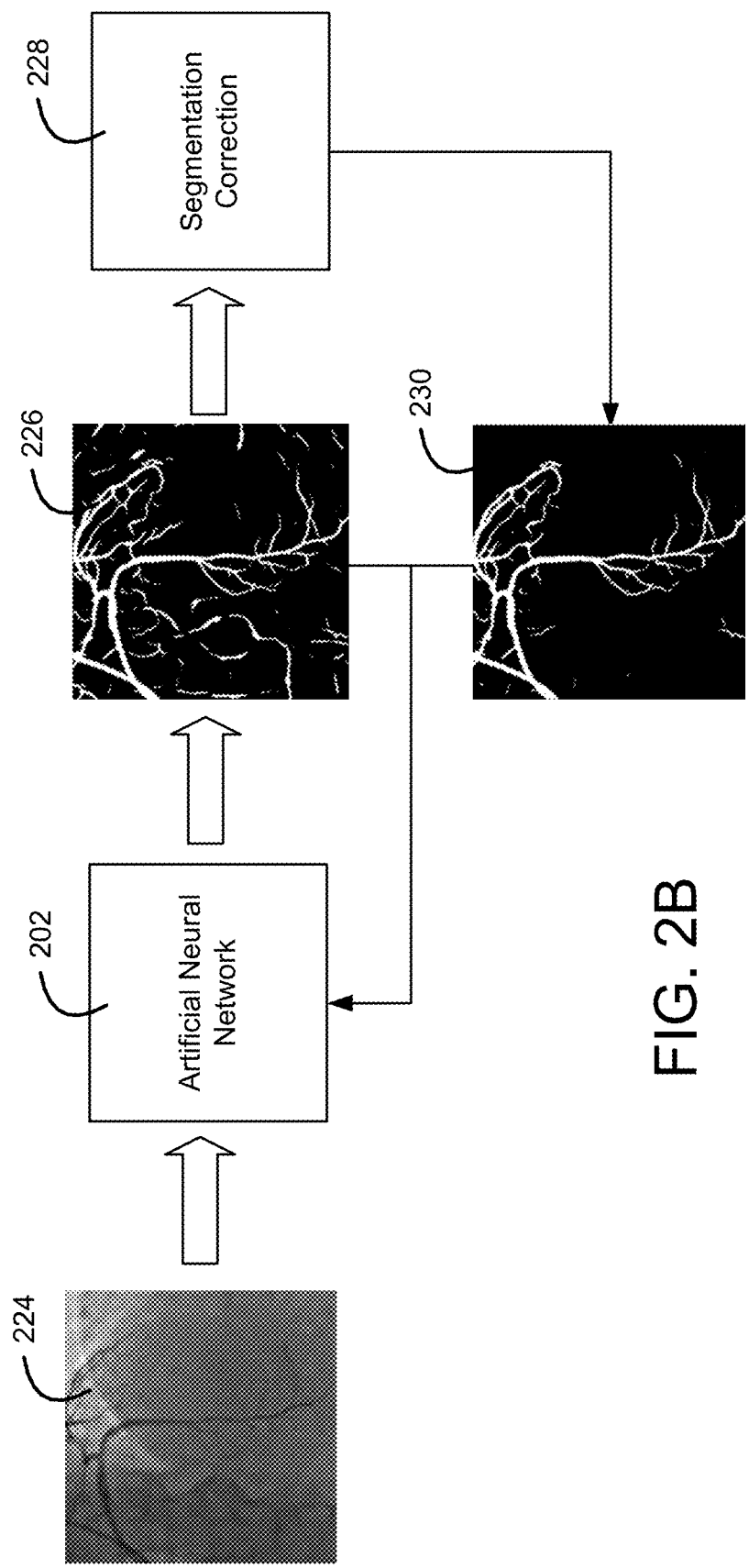
FIG. 2B is a simplified diagram illustrating further training the artificial neural network to process a different type of tubular structures without annotated medical images of the different type of tubular structures.

FIG. 2A and FIG. 2B illustrate example techniques that may be used to train an artificial neural network (e.g., the ANN described with respect to TSS 102 of FIG. 1) to segment tubular structures from a medical image. FIG. 2A illustrates that the artificial neural network may be trained first using a first training dataset comprising labeled medical images of a certain type (e.g., a second type) of tubular structures and FIG. 2B illustrates that the artificial neural network trained using the first training dataset may be further trained to process (e.g., segment) other types (e.g., a first type) of tubular structures without having labeled training images of the other types of tubular structures. As will be described in greater detail below, these example training techniques may allow the artificial neural network to acquire (e.g., learn) the ability to segment multiple types of tubular structures despite only having labeled training data for a specific type of tubular structures.

Referring to FIG. 2A, ANN 202 may be trained initially (e.g., during a first stage of the training process) using medical images 204 of a certain type (e.g., a second type) of tubular structures. Medical images 204 may include, for example, optical images of the retina and the type of tubular structures included in the medical images may include retina blood vessels depicted in the optical images. Medical images 204 may be obtained from a public database and may include corresponding annotated (e.g., labelled) segmentations 206 that may be used as ground truth for the training. When referred to herein, annotated medical images may referred to medical images 204 and the annotated segmentations of tubular structures (e.g., segmentations 206) associated with the medical images. In examples, ANN 202 may receive (e.g., be provided with) medical image 204 during an iteration of the training and predict segmentation 208 based on the received image and current operating parameters (e.g., weights) of the network. Once predicted, segmentation 208 may be compared to segmentation 206 (e.g., ground truth) and a loss associated with the prediction may be determined based on the comparison. The loss may be calculated, for example, using a suitable loss function such as one based on a cross entropy loss, a mean squared error, an L1 norm, an L2 norm, etc. The calculated loss may then be used to adjust the parameters of ANN 202, for example, by backpropagating the loss through ANN 202 (e.g., based on a gradient descent of the loss).

The operations described above may be repeated for multiple iterations until certain criteria for terminating the training are met. For example, the criteria for terminating the training may be satisfied if the loss described above falls below a predetermined thresholds, if a change in the loss value between two training iterations (e.g., between consecutive training iterations) falls below a predetermined threshold, etc. Upon completing the training, the operating parameters of ANN 202 (e.g., constituting a segmentation model) may be deemed suitable for segmenting the type of tubular structures (e.g., retina blood vessels) included in medical images 204. Subsequently, the segmentation capabilities of ANN 202 (e.g., the segmentation model learned during the first stage of training) may be further expanded to cover other types of tubular structures such as blood vessels from other areas of the human body, artificially placed catheters and/or guild wires, etc.

FIG. 2B illustrates an example of training ANN 202 to process (e.g., segment) other types of tubular structures using unlabeled (e.g., without annotation) training images of the other types of tubular structures. During the training (e.g., a second stage of the training process that may follow the first stage illustrated in FIG. 2A), ANN 202 may receive (e.g., be provided with) medical image 224 comprising a type (e.g., a first type) of tubular structures (e.g., coronary arteries) and may predict segmentation 226 based on the received image and the segmentation model (e.g., operating parameters or weights of the network) learned from the first stage. Segmentation 226 may then be corrected by segmentation correction module 228 (e.g., a pseudo-label generator) based on one or more characteristics (e.g., predetermined constraints) of the first type of tubular structures to derive segmentation 230, which may serve as the ground truth for how segmentation 226 should have been generated for the first type of tubular structures. For example, segmentation 230 may be compared to segmentation 226 to determine a difference (e.g., a loss) between the two segmentations and that difference may be used to guide the adjustment of the ANN's operating parameters (e.g., the segmentation model) such that those parameters may be further optimized (e.g., from those learned using medical images 202 of FIG. 2A) to fit the segmentation generated by ANN 202 to corrected segmentation 230. As described herein, the difference or loss between segmentation 226 and segmentation 230 may be determined using a loss function based on MSE, L1 norm, L2 norm, and/or the like. And once determined, the loss may be backpropagated through ANN 202 (e.g., based on a gradient descent associated with the loss) to adjust the parameters of the neural network.

Figure 3A:
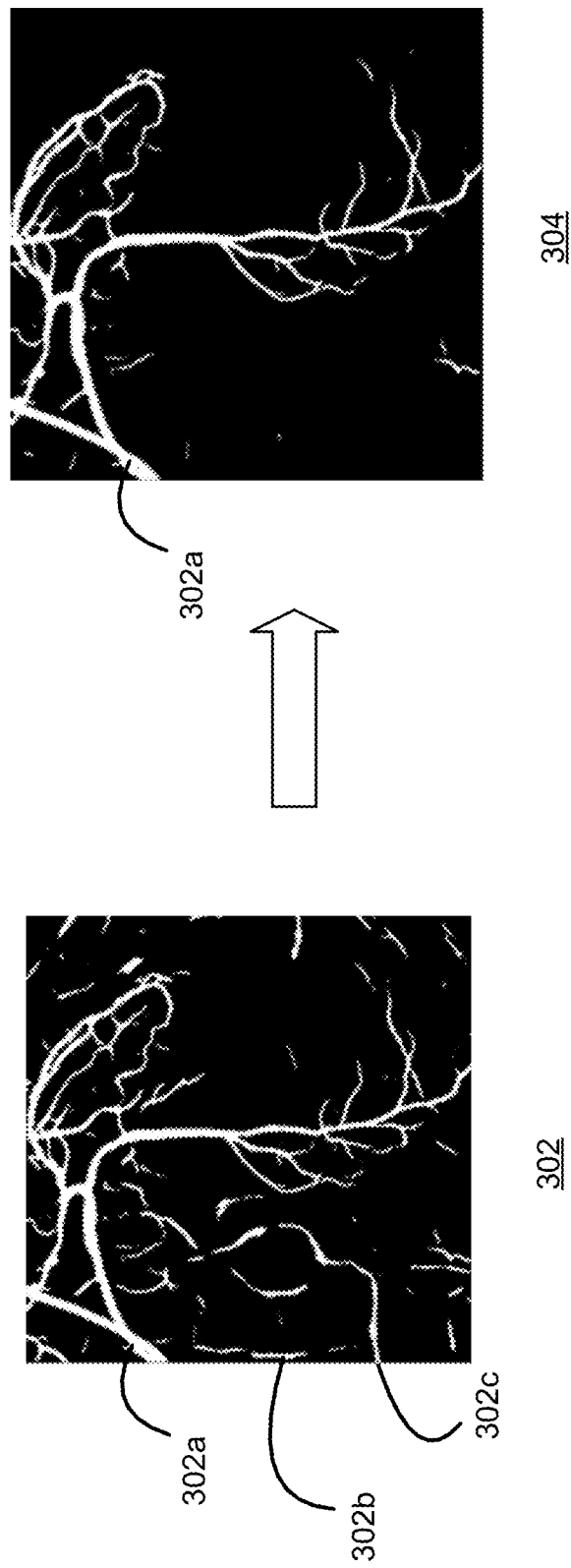
FIG. 3A is a diagram illustrating an example technique for correcting a segmentation generated by an artificial neural network based on the respective sizes of one or more connected regions of the segmentation.
Figure 3B:
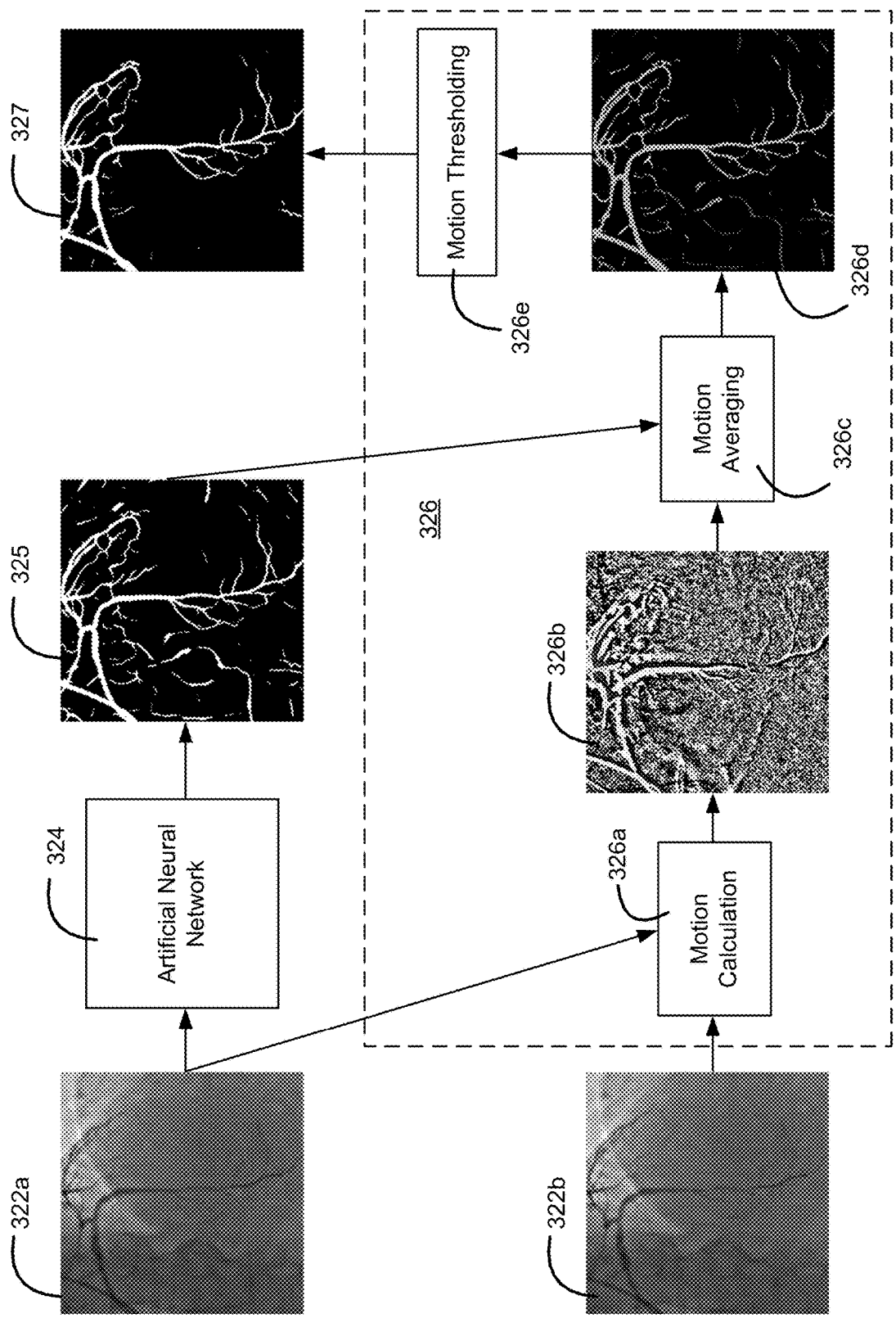
FIG. 3B is a diagram illustrating an example technique for correcting a segmentation generated by an artificial neural network based on motion information associated with identified tubular structures in the segmentation.

Segmentation correction module 228 (e.g., a pseudo-label generator) may be implemented using software and/or hardware components to realize the functionalities described above, and the correction of segmentation 226 may be performed based on characteristics (e.g., constraints) of the first type of tubular structures that may be used to distinguish the areas that include the first type of tubular structures from the areas that do not include the first type of tubular structures. FIG. 3A and FIG. 3B illustrate example techniques for correcting the segmentation predicted by ANN 202 based on characteristics of the first type of tubular structures.

FIG. 3A illustrates an example of correcting a segmentation (e.g., segmentation 226 shown in FIG. 2B) based on the respective sizes of one or more connected regions that correspond to identified tubular structures in the segmentation. The sizes may be used to distinguish the tubular structures because a true tubular structure (e.g., blood vessel, guide wire, etc.) may be occupy a larger area (e.g., a greater length) than a falsely identified tubular structure (e.g., an artifact resembling the target tubular structure). As shown in FIG. 3A, a segmentation correction module (e.g., segmentation correction module 228) may be configured to detect multiple connected regions (e.g., 302a, 302b, 302c, etc.) in segmentation 302 that correspond to identified tubular structures by identifying a respective number of connected pixels (e.g., connected pixels) in each of the regions. For example, the segmentation correction module may identify connected region 302a by identifying a first pixel in the region that is indicated as belonging to the tubular structure and further identifying a chain of consecutive pixels connected to the first pixel that are also indicated as belonging to the tubular structure, until the chain breaks (e.g., by a pixel indicated as not belonging to the tubular structure). The segmentation correction module may then treat the area occupied by the chain of pixels (including the first pixel) as connected region 302a.

Using similar techniques, the segmentation correction module may identify other connected regions (e.g., 302b and 302c) and may further determine the size of each connected region (e.g., connected region 302a, 302b, 302c, etc.), for example, by counting the number of pixels included in each region. The segmentation correction module may then determine whether each of the connected regions truly should be labeled as a tubular structure region (e.g., including the target tubular structures) based on the size of the connected region. For example, the segmentation correction module may determine that connected region 302a is a tubular structure region if the size of connected region 302a is above a threshold (e.g., a preset threshold). The segmentation correction module may further determine that connected regions 302b and 302c are falsely identified as tubular structure regions if the respective sizes of connected regions 302b and 302c are below the threshold. Responsive to making such determinations, the segmentation correction module may, in corrected segmentation 304, maintain the labeling of region 302a as a tubular structure region and change the labeling of regions 302b and 302c as non-tubular structure regions.

FIG. 3B illustrates an example of correcting a segmentation (e.g., segmentation 226 shown in FIG. 2B) based on motion information (e.g., inter-frame signal difference) associated with identified tubular structures in the segmentation. The motion information may be used to distinguish the tubular structures because a tubular structure of interest (e.g., blood vessel, guide wire, etc.) may exhibit larger motions from one image frame to the next compared to other parts of the image frames. As shown in FIG. 3B, the motion of one or more target tubular structures may be determined based on multiple medical images 322a and 322b comprising the tubular structures. Medical images 322a and 322b may be adjacent image frames or may be separated by one or more other image frames and as described herein, medical image 332a may be processed through ANN 324 (e.g., ANN 202 of FIG. 2B) to obtain a segmentation 325 (e.g., a binary map) of the tubular structures. Based on the obtained segmentation 325 and/or the input medical image(s) (e.g., 322a and 322b), segmentation correction module 326 (e.g., segmentation correction module 228 of FIG. 2B) may determine changes (e.g., disparity or displacement of features which may indicate a signal change, a pixel-wise displacement, etc.) that may have occurred in one or more areas (e.g., tubular and/or non-tubular areas) of segmentation 325, and segmentation correction module 326 may further determine motions associated with the one or more areas based on the changes. Segmentation correction module 326 may assess the changes, for example, by including a motion calculation module 326a configured to calculate the magnitude of a motion field or flow field 326b based on one or more features (e.g., image gradients and/or inter-frame pixel intensity differences) of medical images 322a and 322b. In examples, such a motion field or flow field may include a vector, a grid of vectors, a vector-value function, and/or the like that may indicate the disparity or displacement of features from medical image 322a to medical image 322b for the tubular and non-tubular objects depicted in the medical images.

Since the disparity or displacement of features (e.g., or lack thereof) may be indicative of the respective motions (or lack of motions) of the objects depicted in medical images 322a and 322b and the tubular structures of interest in the images may (e.g., inherently) have larger motions than the non-tubular structures in the images, segmentation correction module 328 may be able to distinguish the true tubular structures in segmentation 325 from the falsely identified tubular structures based on motion field or flow field 326b. For example, segmentation correction module 326 may include a motion averaging module 326c configured to generate a motion map 326d, in which each pixel may contain a value that depicts the motion (e.g., an average motion calculated from multiple images) of a connected region in segmentation 325 to which the pixel may belong. Segmentation correction module 326 may further include a motion thresholding module 326e that may be configured to determine that the areas of segmentation 325 that have large motions (e.g., above a threshold) are correctly labeled as tubular structures and therefore the labeling for these areas should be maintained as such in corrected segmentation 327. Motion thresholding module 326e may further determine that the areas of segmentation 325 that have smaller motions (e.g., below a threshold) are incorrectly labeled as tubular structures and therefore those areas should be relabeled as non-tubular areas in corrected segmentation 327. Motion thresholding module 326c may use the motion of a background area as the threshold for correcting the labeling in segmentation 325. For example, motion thresholding module 326e may determine that an area is correctly labeled as including the tubular structures of interest if the area exhibits larger motions than the background area and that an area is incorrectly labeled as including the tubular structures of interest if the area exhibits the same or smaller motions than the background area. Motion thresholding module 326c may also use a preset (e.g., pre-configured or pre-determined) motion threshold for correcting the labeling in segmentation 325.

Various techniques may be applied to improve the accuracy of the motion estimation described above. For example, background pixels of segmentation 325 (e.g., pixels labeled as 0 in the binary map that indicates the segmentation) may be registered using optical flow based techniques to stabilize the background from frame to frame (e.g., keep stationary objects in the background at the same image coordinates from frame to frame) so that the motion of the tubular structures in the foreground may be readily determined. Furthermore, labeled medical images of the target tubular structures, if available, may be used along with the publicly available labeled training images described herein (e.g., the retina blood vessel images) to train the segmentation neural networks described herein, which may accelerate the transfer learning process described herein and/or improve the segmentation capabilities of the neural networks.

Figure 4:
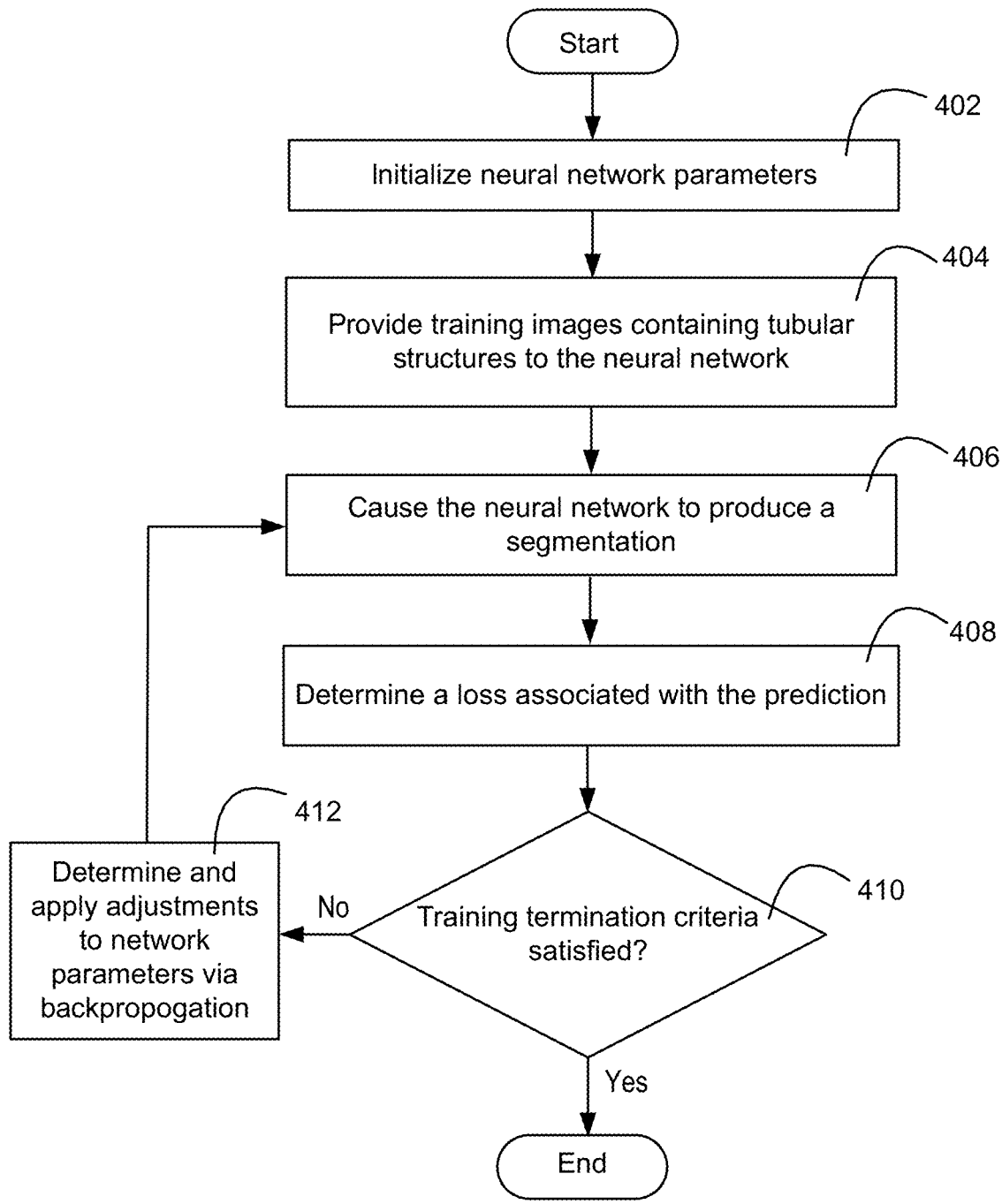
FIG. 4 is a flow diagram illustrating example operations that may be performed for training a neural network in accordance with one or more embodiments described herein.

FIG. 4 illustrates example operations that may be associated with training a neural network (e.g., ANN 102 of FIG. 1 and/or ANN 202 of FIGS. 2A and 2B) to perform the segmentation tasks described herein. As shown, the training operations may include initializing the parameters of the neural network (e.g., weights associated with the various filters or kernels of the neural network) at 402. The parameters may be initialized, for example, based on samples collected from one or more probability distributions or parameter values of another neural network having a similar architecture. The training operations may further include providing training data (e.g., publicly available labeled medical images comprising a type of tubular structures) to the neural network at 404, and causing the neural network to predict a segmentation at 406. At 408, the predicted segmentation may be compared with a ground truth such as an annotated ground truth segmentation (e.g., segmentation 206 shown in FIG. 2A) or a segmentation generated using the techniques described herein (e.g., corrected segmentation 230 of FIG. 2B) to determine a loss associated with the prediction. The loss may be determined using a suitable loss function such as, e.g., a loss function based on mean squared errors (MSE), L1 norm, L2 norm, etc. Once determined, the loss may be evaluated at 410 to determine whether one or more training termination criteria have been satisfied. For example, a training termination criterion may be deemed satisfied if the loss(es) described above is below a predetermined thresholds, if a change in the loss(es) between two training iterations (e.g., between consecutive training iterations) falls below a predetermined threshold, etc. If the determination at 410 is that the training termination criterion has been satisfied, the training may end. Otherwise, the loss may be backpropagated (e.g., based on a gradient descent associated with the loss) through the neural network at 412 before the training returns to 406.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 5:
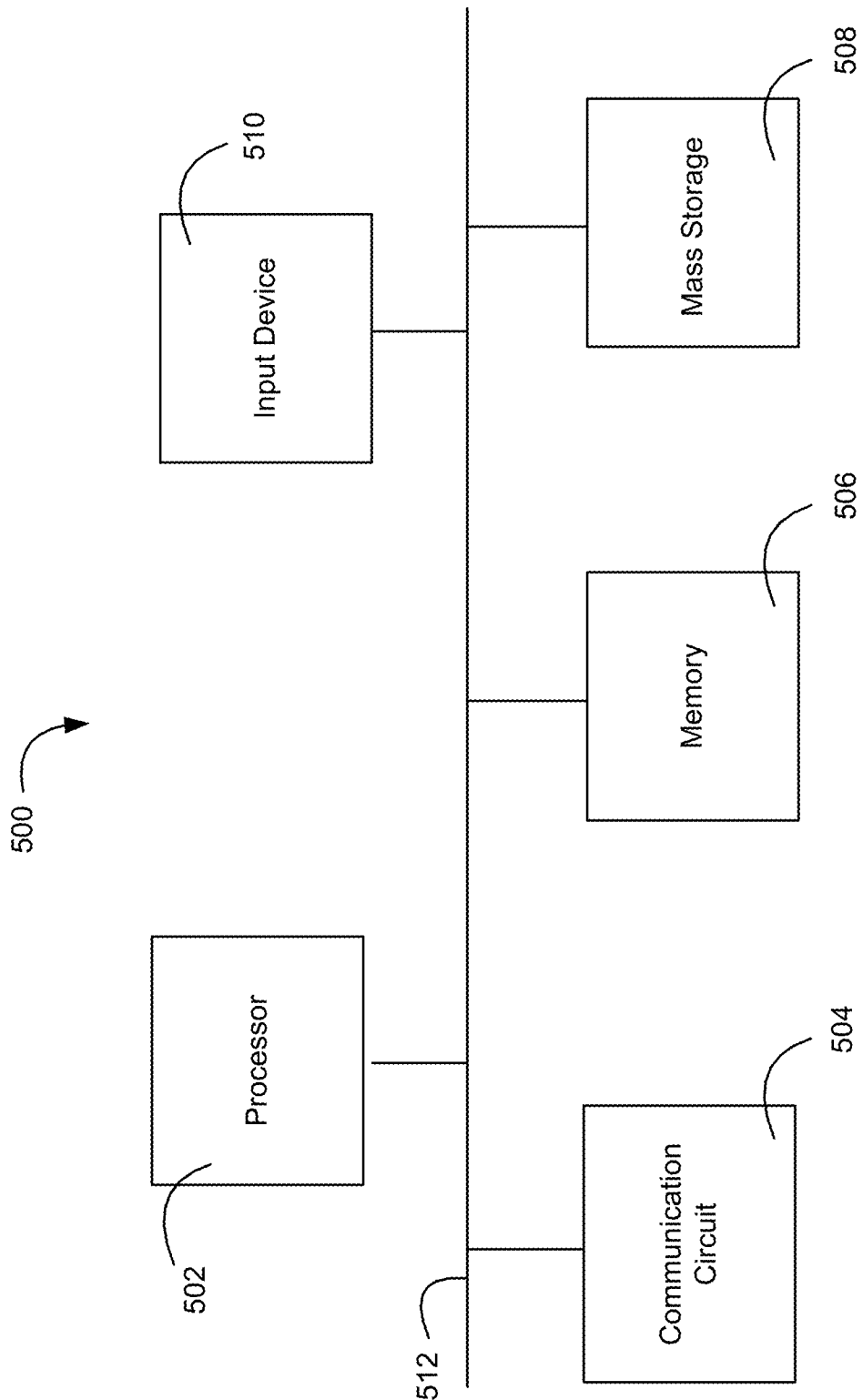
FIG. 5 is a block diagram illustrating example components of an apparatus that may be configured to perform the tubular structure segmentation tasks described herein.

The systems, methods, and/or instrumentalities described herein may be implemented using one or more processors, one or more storage devices, and/or other suitable accessory devices such as display devices, communication devices, input/output devices, etc. FIG. 5 is a block diagram illustrating an example apparatus 500 that may be configured to perform the tubular structure segmentation tasks described herein. As shown, apparatus 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 500 may further include a communication circuit 504, a memory 506, a mass storage device 508, an input device 510, and/or a communication link 512 (e.g., a communication bus) over which the one or more components shown in the figure may exchange information.

Communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 502. Input device 510 may include a keyboard, a mouse, a voice-controlled input device, a touch sensitive input device (e.g., a touch screen), and/or the like for receiving user inputs to apparatus 500.

It should be noted that apparatus 500 may operate as a standalone device or may be connected (e.g., networked, or clustered) with other computation devices to perform the functions described herein. And even though only one instance of each component is shown in FIG. 5, a skilled person in the art will understand that apparatus 500 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing." "determining." "enabling." "identifying." "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
one or more processors configured to:
receive a medical image, wherein the medical image depicts a first type of tubular structures; and
segment the first type of tubular structures from the medical image using an artificial neural network (ANN), wherein the ANN is trained to segment the first type of tubular structures through a training process that comprises:
training the ANN during a first stage of the training process to learn a segmentation model for segmenting a second type of tubular structures based on annotated medical images of the second type of tubular structures, wherein the second type of tubular structures is a different type of tubular structures than the first type of tubular structures; and
further training the ANN during a second stage of the training process to segment the first type of tubular structures based on the segmentation model learned from the first stage of the training process, wherein the second stage of the training process comprises:
providing a first training image comprising the first type of tubular structures to the ANN;
using the ANN to generate a first segmentation of the first type of tubular structures based on the first training image and the segmentation model learned from the first stage of the training process;
correcting the first segmentation generated by the ANN based on one or more characteristics of the first type of tubular structures to derive a corrected segmentation; and
adjusting the segmentation model based on a difference between the first segmentation generated by the ANN and the corrected segmentation.

2. The apparatus of claim 1, wherein correcting the first segmentation based on the one or more characteristics of the first type of tubular structures comprises:
identifying one or more connected regions that correspond to the first type of tubular structures in the first segmentation;
determining a respective size of each of the one or more connected regions; and
indicating, in the corrected segmentation, whether each of the one or more connected regions includes the first type of tubular structures based on the size of the connected region, wherein the connected region is indicated as including the first type of tubular structures on a condition that the size of the connected region is above a threshold and wherein the connected region is indicated as not including the first type of tubular structures on a condition that the size of the connected region is below the threshold.

3. The apparatus of claim 2, wherein the respective size of each of the one or more connected regions is determined based on a respective number of pixels comprised in the each of the one or more connected regions.

4. The apparatus of claim 2, wherein identifying the one or more connected regions that correspond to the first type of tubular structures in the first segmentation comprises identifying a consecutive number of pixels in the first segmentation that are indicated as belonging to the first type of tubular structures and treating an area occupied by the consecutive number of pixels as a connected region.

5. The apparatus of claim 1, wherein correcting the first segmentation based on the one or more characteristics of the first type of tubular structures comprises:
determining a motion of an area of the first segmentation that is indicated as including the first type of tubular structures; and
indicating, in the corrected segmentation, whether the area includes the first type of tubular structures based on the motion of the area.

6. The apparatus of claim 5, wherein determining the motion of the area comprises calculating a change between the first training image and a second training image that includes the first type of tubular structures.

7. The apparatus of claim 6, wherein determining the motion of the area further comprises registering the first training image with the second training image.

8. The apparatus of claim 5, wherein correcting the first segmentation based on the one or more characteristics of the first type of tubular structures comprises determining that the area of the first segmentation that is indicated as including the first type of tubular structures has a larger motion than a background area of the first segmentation and labeling the area as including the first type of tubular structures in the corrected segmentation based on the determination.

9. The apparatus of claim 5, wherein correcting the first segmentation based on the one or more characteristics of the first type of tubular structures comprises determining that the area of the first segmentation that is indicated as including the first type of tubular structures has a substantially similar motion as a background area of the first segmentation and labeling the area as not including the first type of tubular structures in the corrected segmentation based on the determination.

10. The apparatus of claim 1, wherein the first type of tubular structures includes coronary vessels, a catheter placed in a human body, or a guide wire placed in the human body and wherein the second type of tubular structures includes blood vessels located in a different area of the human body than the coronary vessels.

11. The apparatus of claim 1, wherein the medical image includes an X-ray fluoroscopic image.

12. A method for segmenting tubular structures, the method comprising:
receiving a medical image, wherein the medical image depicts a first type of tubular structures; and
segmenting the first type of tubular structures from the medical image using an artificial neural network (ANN), wherein the ANN is trained to segment the first type of tubular structures through a training process that comprises:

training the ANN during a first stage of the training process to learn a segmentation model for segmenting a second type of tubular structures based on annotated medical images of the second type of tubular structures, wherein the second type of tubular structures is a different type of tubular structures than the first type of tubular structures; and further training the ANN during a second stage of the training process to segment the first type of tubular structures based on the segmentation model learned from the first stage of the training process, wherein the second stage of the training process comprises:

providing a first training image comprising the first type of tubular structures to the ANN;

using the ANN to generate a first segmentation of the first type of tubular structures based on the first training image and the segmentation model learned from the first stage of the training process;

correcting the first segmentation generated by the ANN based on one or more characteristics of the first type of tubular structures to derive a corrected segmentation; and adjusting the segmentation model based on a difference between the first segmentation generated by the ANN and the corrected segmentation.

13. The method of claim 12, wherein correcting the first segmentation based on the one or more characteristics of the first type of tubular structures comprises:

identifying one or more connected regions that correspond to the first type of tubular structures in the first segmentation;

determining a respective size of each of the one or more connected regions; and indicating, in the corrected segmentation, whether each of the one or more connected regions includes the first type of tubular structures based on the size of the connected region, wherein the connected region is indicated as including the first type of tubular structures on a condition that the size of the connected region is above a threshold and wherein the connected region is indicated as not including the first type of tubular structures on a condition that the size of the connected region is below the threshold.

14. The method of claim 13, wherein the respective size of each of the one or more connected regions is determined based on a respective number of pixels comprised in the each of the one or more connected regions.

15. The method of claim 13, wherein identifying the one or more connected regions that correspond to the first type of tubular structures in the first segmentation comprises identifying a consecutive number of pixels in the first segmentation that are indicated as belonging to the first type of tubular structures and treating an area occupied by the consecutive number of pixels as a connected region.

16. The method of claim 12, wherein correcting the first segmentation based on the one or more characteristics of the first type of tubular structures comprises:

determining a motion of an area of the first segmentation that is indicated as including the first type of tubular structures; and indicating, in the corrected segmentation, whether the area includes the first type of tubular structures based on the motion of the area.

17. The method of claim 16, wherein determining the motion of the area comprises calculating a change between the first training image and a second training image that includes the first type of tubular structures.

18. The method of claim 16, wherein correcting the first segmentation based on the one or more characteristics of the first type of tubular structures comprises determining that the area of the first segmentation that is indicated as including the first type of tubular structures has a larger motion than a background area of the first segmentation and labeling the area as including the first type of tubular structures in the corrected segmentation based on the determination.

19. The method of claim 16, wherein correcting the first segmentation based on the one or more characteristics of the first type of tubular structures comprises determining that the area of the first segmentation that is indicated as including the first type of tubular structures has a substantially similar motion as a background area of the first segmentation and labeling the area as not including the first type of tubular structures in the corrected segmentation based on the determination.

20. A method for training an artificial neural network (ANN) to segment a first type of tubular structures, the method comprising:

training the ANN during a first stage of a training process to learn a segmentation model for segmenting a second type of tubular structures based on annotated medical images of the second type of tubular structures, wherein the second type of tubular structures is a different type of tubular structures than the first type of tubular structures; and further training the ANN during a second stage of the training process to segment the first type of tubular structures based on the segmentation model learned from the first stage of the training process, wherein the second stage of the training process comprises:

providing a first training image comprising the first type of tubular structures to the ANN;

using the ANN to generate a first segmentation of the first type of tubular structures based on the first training image and the segmentation model learned from the first stage of the training process;

correcting the first segmentation generated by the ANN based on one or more characteristics of the first type of tubular structures to derive a corrected segmentation; and adjusting the segmentation model based on a difference between the first segmentation generated by the ANN and the corrected segmentation.

* * * * *